March 24, 1936.  J. C. McCUNE  2,035,086
BRAKE CONTROL MEANS
Filed July 12, 1934  2 Sheets-Sheet 1

INVENTOR
JOSEPH C. McCUNE
BY Wm. M. Cady
ATTORNEY

March 24, 1936. J. C. McCUNE 2,035,086
BRAKE CONTROL MEANS
Filed July 12, 1934 2 Sheets-Sheet 2
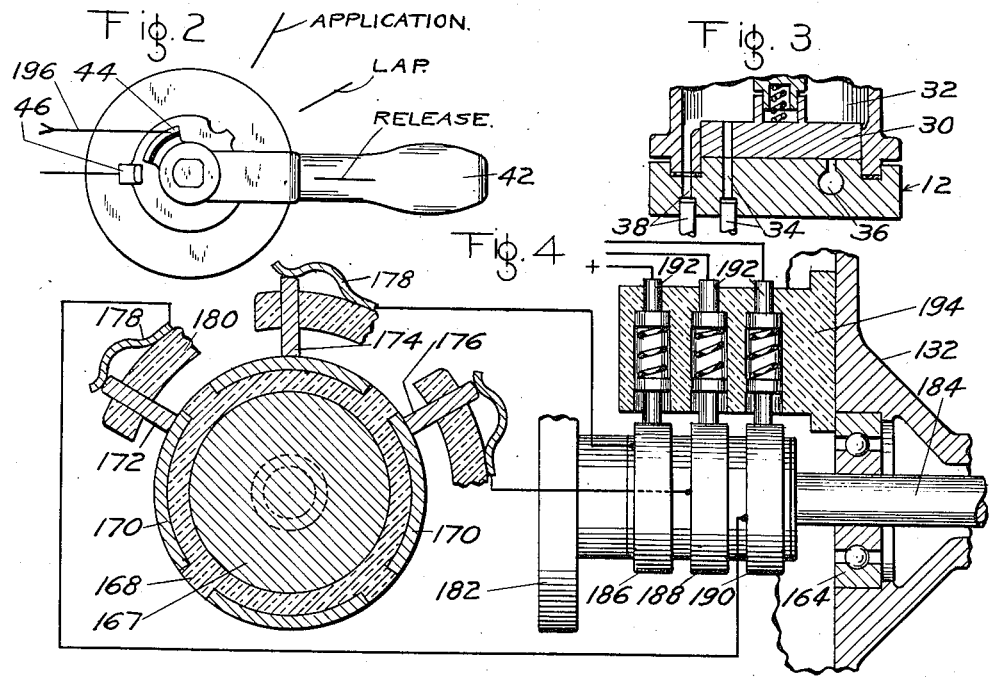
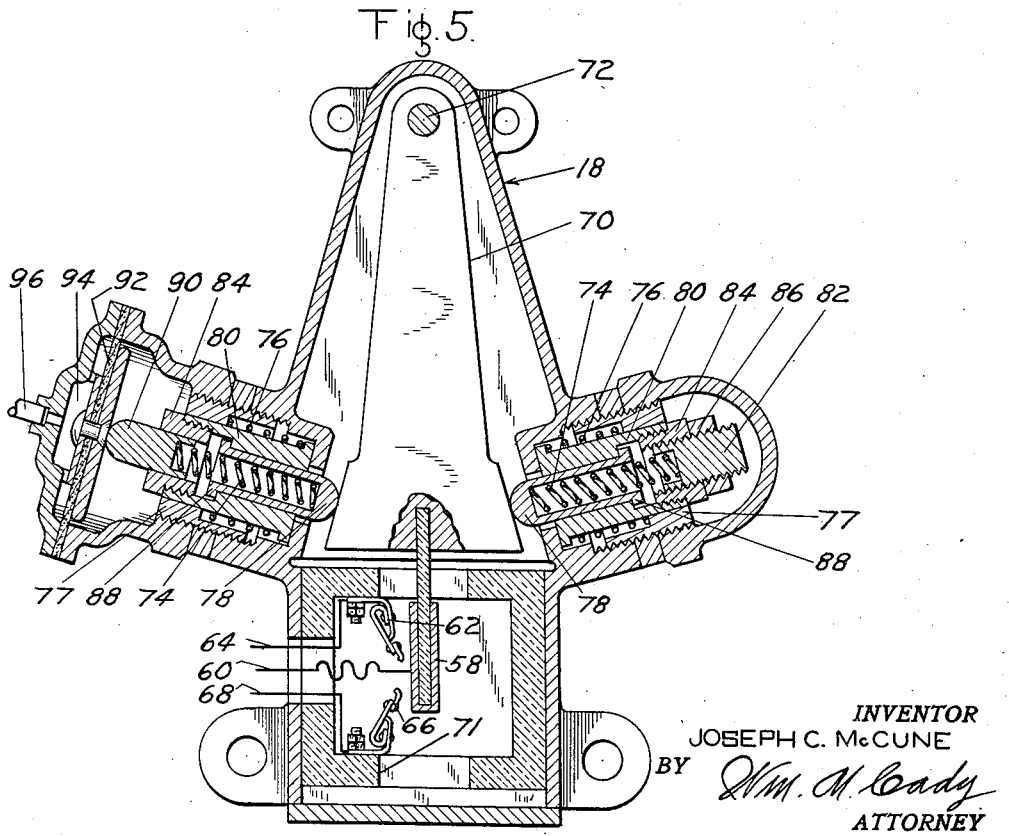
INVENTOR
JOSEPH C. McCUNE
BY Wm. M. Cady
ATTORNEY Patented Mar. 24, 1936

2,035,086

UNITED STATES PATENT OFFICE 2,035,086

BRAKE CONTROL MEANS

Joseph C. McCune, Edgewood, Pa., assignor to The Westinghouse Air Brake Company, Wilmerding, Pa., a corporation of Pennsylvania Application July 12, 1934, Serial No. 734,732

22 Claims. (Cl. 303—24)

This invention relates to brake control means, principally intended for the control of the brakes on trains and traction vehicles designed for high speed service.

When trains and traction vehicles are operated at relatively high speeds, it is necessary to apply high retarding forces in order to bring the vehicle or train to a stop in a reasonably short time. When such high retarding forces are appiled there is considerable danger of the wheels sliding as the speed of the train or vehicle diminshes and the coefficient of friction between braking parts increases. Wheel sliding is objectionable because the retarding force produced by sliding wheels is less and because uneven wear is caused on the wheels.

It has heretofore been proposed to control the retarding forces applied to a vehicle or train by controlling the rate of retardation produced by an application of the brakes, through employment of a retardation controller. If the track conditions on a railway system were always the same and uniform on a given track line, then the retardation controller could be set to so control the brakes as to produce the maximum rate of retardation permitted by the coefficient of adhesion between vehicle wheels and track rails. This would then permit the vehicle or train to be brought to a stop in the shortest possible time, with the danger of wheel sliding greatly minimized.

As a practical matter however, rail conditions vary over wide limits, due partly to weather conditions and partly to conditions of the rails and vehicle wheels, so that it is rarely possible to preset the retardation controller to meet the varying conditions encountered. Further, it is most generally impracticable to manually adjust the setting of the retardation controller when running to meet the varying track conditions, so that the retardation controller is usually adjusted to control the application of the brakes according to average track conditions. With such a setting it will be obvious that for poor rail conditions there may result considerable sliding of the wheels, whereas for good rail conditions stops will not be made in the shortest possible time.

The maximum retarding force which may be applied to a vehicle wheel is limited by the coefficient of adhesion between the wheel and track rail. In general, this maximum retarding force is equivalent to the product of the coefficient of adhesion and the force with which the wheel presses on the rail. The braking of a vehicle is therefore said to be limited by the adhesion between wheels and rails. Where the term "adhesion" is used herein it is to be understood as referring to the coefficient of adhesion.

According to one feature of my invention, I propose to provide a brake control apparatus which will so control an application of the brakes as to bring a vehicle or train to a stop in the shortest possible distance permitted by the then existing rail conditions, without danger of wheel sliding.

According to another feature of my invention, I propose to provide means for determining the adhesion between the vehicle wheels and track rails for the then existing conditions, and for thereafter so controlling the application of the brakes as to utilize but not exceed this adhesion.

A yet further object of my invention is to provide a retardation controller device for controlling the rate of retardation, and means for setting the retardation controller device at the time the brakes are applied to limit the rate of retardation to the maximum permitted by the adhesion between wheels and rails, and to accomplish this setting of the retardation controller before the vehicle reaches the wheel slipping stage.

A still further object of the invention is to provide means for determining the adhesion between the loading bearing vehicle wheels and track rails, which operates independently of the load bearing wheels, but which determines the true value of the actual adhesion between the load bearing wheels and track rails.

A still further object of the invention is to provide means for automatically setting a retardation controller device according to the degree of fluid under pressure supplied to effect an application of the brakes upon failure of the means provided for setting the retardation controller according to the adhesion between wheels and rails.

Yet further objects and advantages of the invention will be apparent from the description which follows, which is illustrated in the attached drawings, wherein, Fig. 1 is a sechematic and somewhat diagrammatic embodiment of one form which the invention may take.

Fig. 2 is a top plan view of the brake valve device shown in Fig. 1.

Fig. 3 is a partial diagrammatic view of the same brake valve device.

Fig. 4 is a view partly in elevation and partly in section of a portion of the adhesion measuring apparatus shown at the bottom of Fig. 1.

Fig. 5 is a diagrammatic and sectional view of the retardation controller device shown to the right of Fig. 1.

Figure 1:
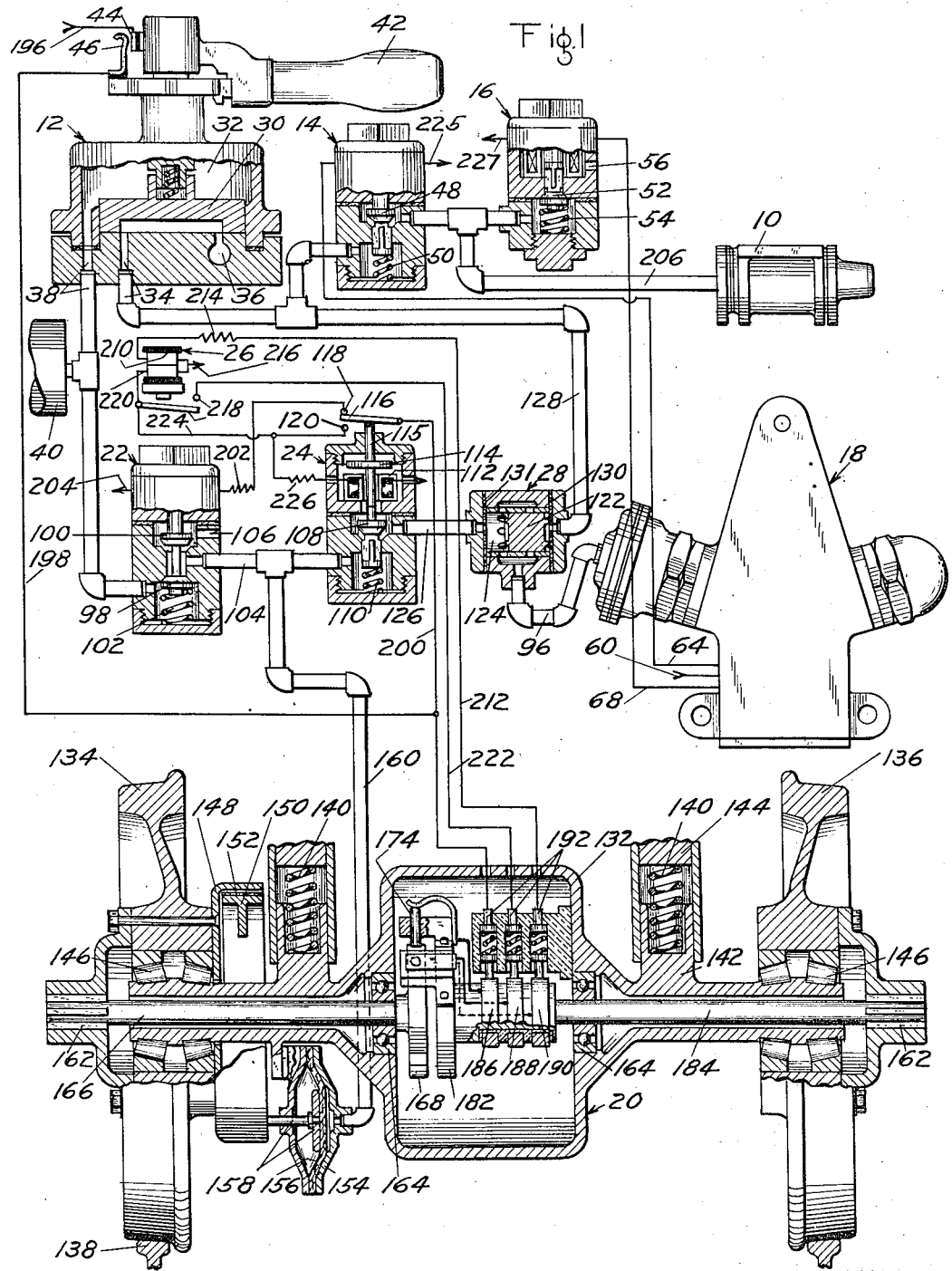

Referring now to Figure 1, I have shown a simple straight air brake equipment in which the supply of fluid under pressure to a brake cylinder 10, for braking the vehicle, is manually controlled by a straight air brake valve device 12. For controlling the degree of pressure in the brake cylinder 10 in accordance with a desired rate of retardation, I have provided a cut-off magnet valve device 14, a release magnet valve device 16 and a retardation controller device 18.

For setting the retardation controller device 18 to maintain the maximum possible rate of retardation permitted by the adhesion between vehicle wheels and track rails, I have provided an adhesion measuring apparatus, designated in its entirety at 20, which operates in conjunction with magnet valve device 22, a cut-off magnet valve device 24 and a quick pick-up, slow release relay 26.

In order that the retardation controller device 18 may be set in accordance with operation of the brake valve device 12 in case the adhesion measuring apparatus should fail to function, I have provided a double check valve device 28.

Considering now these devices more in detail, the straight air brake valve device 12 may be of the rotary type having a rotary valve 30 disposed in a chamber 32 and adapted when in release position, as shown in Fig. 1, to connect pipe and passage 34 leading to the brake cylinder 10, with an exhaust port 36 leading to the atmosphere. In application position, as shown in Fig. 3, the rotary valve 30 is adapted to connect the pipe and passage 34 leading to the brake cylinder with the chamber 32, which is in constant communication with a pipe and passage 38 leading to a source of fluid under pressure, as a reservoir 40.

The rotary valve 30 is adapted to be actuated by movement of a handle 42, which may be connected to the rotary valve in the manner commonly employed in such valves. When the handle 42 is moved initially toward application position, a contact 44 secured thereto and insulated therefrom engages a stationary contact 46 secured to and insulated from a stationary part of the brake valve device, for a purpose which will appear presently.

The cut-off magnet valve device 14 is disposed in the communication between the brake valve device 12 and the brake cylinder 10, and is provided with a valve 48, which is urged toward unseated position by a spring 50 and toward seated position by action of an electromagnet in the upper part of the valve device casing, which when energized actuates the valve 48 downwardly.

When the valve 48 is in unseated position, fluid under pressure may be supplied to the brake cylinder 10 by operation of the brake valve device 12, and when the valve 48 is in seated position this supply is cut off.

The release magnet valve device 16 is adapted to release fluid pressure from the brake cylinder 10. This valve device is provided with a valve 52, which is urged toward seated position by a spring 54 and to unseated position by action of an electromagnet in the upper part of the valve device casing, which when energized actuates the valve 52 downwardly.

When the valve 52 is in unseated position, fluid pressure in the brake cylinder 10 is released to the atmosphere, past the unseated valve 52, and through port 56. When the valve 52 is in seated position, this communication is cut off.

Operation of the magnet valve devices 14 and 16 is controlled by the retardation controller device 18. This device is provided with a movable contact 58 connected to a convenient source of current supply by conductor 60, a resilient stationary contact 62 connected to the electromagnet in the cut-off magnet valve device 14 by conductor 64, and a resilient stationary contact 66 connected to the electromagnet in the release magnet valve device 16 by conductor 68.

The movable contact 58 is carried by and insulated from a pendulum 70, which is pivotally supported at 72. The stationary contacts are supported from an insulating member 71, as shown.

The retardation controller device is positioned on the vehicle so that when the vehicle is decelerating, the pendulum 70 moves to the left under the resulting force of inertia. Movement of the pendulum 70 to the right or left is opposed first by a light spring 74, for short movements, and then by a heavy spring 76, for greater movements.

Each spring 74 acts upon a plunger 78 carried in a sleeve member 80. The right sleeve member 80 is provided with an adjusting nut 82, for adjusting the tension on the right hand spring 74, and also an adjusting member 84, provided with a lock nut 86, for adjusting movement of the plunger 78 with respect to the sleeve member 80. The left hand sleeve member 80 carries a slidable plunger 90 for adjusting tension of the left hand light spring 74, as will appear more fully presently.

Each sleeve member 80 is urged toward the pendulum 70 by action of a heavy spring 76, the tension of which is regulated by a member 77, so that when the associated light spring 74 is compressed sufficiently for the collar or flange 88 on the plunger 78 to engage the adjusting member 84, further movement of the plunger 78 is resisted by the heavy spring 76.

Since the movement of the pendulum 70 is proportional to the force of inertia acting upon the pendulum, and since the force of inertia is proportional to the rate of speed change, it will be apparent that one rate of speed change will cause the pendulum to move far enough to compress the light spring 74, while another rate of speed change will be required to compress the heavy spring 76. The stationary contact 62 is spaced from the movable contact 58 a distance such that when the light spring 74 has been compressed to the point where the flange 88 engages the adjustable member 84, the movable contact 58 will have engaged the stationary contact 62. The stationary contact 66 is spaced such that when the heavy spring 76 has been compressed a predetermined distance, the movable contact 58 engages this stationary contact.

In order that the tension on the left hand light spring 74 may be adjusted to provide for different rates of retardation at which the movable contact 58 engages the stationary contact 62, the adjusting nut 82 on the left has been replaced by the plunger 90, which, as before stated, is slidable in the left hand adjusting member 84. The plunger 90 is adapted to be actuated by a diphragm member 92, which is secured to the casing of the retardation controller device in such a manner as to provide a chamber 94 to one side thereof, to which fluid under pressure may be supplied by way of pipe 96.

The magnet valve device 22 is provided for effecting a supply of fluid under pressure to the chamber 94 in the retardation controller device, and to the adhesion measuring apparatus 20, as will hereinafter more fully appear. The magnet valve device 22 is provided with a supply valve 98 and a release valve 100, which are urged toward seated and unseated positions, respectively, by a spring 102, and toward unseated and seated positions, respectively, by action of an electromagnet in the upper part of the valve device casing, which when energized actuates both valves downwardly.

When the supply valve 98 is unseated and the release valve 100 seated, fluid under pressure is supplied to pipe 104 leading to both the retardation controller device and the adhesion measuring apparatus, and when the supply valve 98 is seated and the release valve 100 unseated, fluid pressure in pipe 104 is released to the atmosphere by way of port 106.

The cut-off magnet valve device 24 is disposed between the magnet valve device 22 and the retardation controller device 18, for the purpose of cutting off the supply of fluid to the chamber 94 and trapping a predetermined pressure therein, as will hereinafter more fully appear. This valve device is provided with a valve 108, which is urged toward unseated position by a spring 110, and toward seated position by action of an electromagnet 112, which when energized attracts thereto an armature 114 secured to a plunger 115, which engages the stem of the valve 108 to actuate the valve downwardly.

When the valve 108 is in unseated position fluid may flow to the chamber 94, and when the valve is in seated position this flow is cut off and the pressure supplied to the chamber 94 is trapped therein.

Operation of the magnet valve device 24 is adapted to also operate a switch device associated therewith having a movable contact 116 and stationary contacts 118 and 120. The movable contact 116 is secured to and insulated from the plunger 115. When the electromagnet 112 is deenergized, the movable contact 116 is in its uppermost position and in engagement with the stationary contact 118, and when the electromagnet is energized, the movable contact 116 is actuated downwardly to disengage stationary contact 118 and to engage stationary contact 120. The purpose of the operation of these contacts will appear presently.

The double check valve device 28 is disposed between the magnet valve device 24 and the retardation controller device, and is provided with a movable valve 122 disposed in a chamber 124. One end of the chamber 124 is connected by a pipe 126 to the cut-off magnet valve device 24, and the other end of the chamber 124 is connected by pipes 128 and 34 to the straight air brake valve device 12. The chamber 124 is also connected by the ports and passages shown therein to the pipe 96 leading to the chamber 94 in the retardation controller device.

When the pressure supplied to the chamber 124 to the left of the valve 122 exceeds that to the right, the valve is forced to the right in sealing engagement with the gasket 130. When the pressure to the right of the valve 122 exceeds that to the left, the valve is forced to the left in sealing engagement with the gasket 131. From the arrangement of ports and passages shown, it will be obvious that the flow of fluid to the chamber 94 in the retardation controller device can only be from the supply which predominates in pressure.

The adhesion measuring apparatus 20 controls operation of the magnet valve device 24 and the relay 26, so as to trap in the chamber 94 of the retardation controller device a pressure in accordance with the value of the adhesion between the vehicle wheels and track rails. This apparatus is embodied in a housing or casing 132 which has rotatably associated therewith a measuring wheel 134 and a free rolling wheel 136.

The housing 132 is urged downwardly, and the wheels 134 and 136 are pressed into engagement with the track rail 138, by springs 140 disposed between a spring cage 142 integral with the housing 132 and guiding members 144 integral with the vehicle frame. The wheels 134 and 136 are therefore pressed into engagement with the track rail in accordance with the tension on the springs 140. These wheels are not intended to carry any part of the vehicle load, but are sufficiently loaded so as to engage with the track rails with sufficient force to provide for measuring the braking force which will just produce sliding of the braked wheel. The determination of this braking force is a measure of the adhesion between the braked wheel and the track rail, and is a true measure of that between the loaded vehicle wheels and rails.

Each of the wheels is rotatably disposed on an end portion of the housing 132 through roller bearings 146. Secured to the measuring wheel 134 is an automobile type of brake drum 148, and disposed therein is an internal expanding type set of brake shoes 150 provided with brake lining 152. The brake shoes 150 are adapted to be actuated into frictional engagement with the brake drum 148 when fluid under pressure is supplied to an automobile type brake cylinder 154. This cylinder is provided with a flexible diaphragm 156, which is adapted to actuate a piston and rod 158 when fluid under pressure is supplied to one side of the diaphragm. The piston and rod 158 may actuate a suitable mechanism to cause outward movement of the brake shoes 150, in accordance with common practice in the design of automotive types of brakes. Fluid under pressure to operate the brake cylinder 154 may be supplied through pipe 160.

The brake lining 152 is preferably of the type which for a given braking force produces substantially the same retarding force on the member being braked for all speeds, that is, the coefficient of friction between the brake lining and brake drum is practically constant for all speeds.

The measuring wheel 134 has rigidly secured thereto, as by keys 162, one end of a shaft 166. The other and free end of the shaft is disposed in ball bearings 164 mounted in the housing 132. Secured to the free end of the shaft 166, adjacent the ball bearings 164, is a flange or disc 167 having secured to the periphery thereof an insulating annulus 168, of hard rubber, bakelite, or the like. Disposed in spaced relation on the periphery of the insulating annulus 168 are four contact segments 170 of equal length. These segments may be of copper, brass, or similar material.

Arranged circumferentially of the insulating annulus 168, and spaced apart by predetermined distances, are three brushes 172, 174 and 176. The brushes may be of carbon or similar material and are pressed into engagement with the annulus 168 by electrically conducting spring members 178 secured to insulating brackets 180 carrying the brushes. The brushes 172, 174 and 176 are adapted to be intermittently connected by the contact segments 170, in a manner to be more fully described hereinafter.

The insulating brackets 180 are carried by a spider member 182 secured to a shaft 184, which, similar to the aforementioned shaft 166, is rigidly secured at one end to the free rolling wheel 136, as by keys 162, and rotatably disposed in the housing 132 on ball bearings 164 at the other end.

In order to provide external electrical connections between the brushes 172, 174 and 176 and other of the devices heretofore described, there are secured to and insulated from the spider member 182 three slip rings 186, 188 and 190. Pressed into engagement with each of these slip rings is a brush assembly 192, the three brush assemblies for the three rings being supported in an insulating bracket 194 carried by the housing 132.

As is diagrammatically indicated in Fig. 4, the slip ring 186 is connected to the brush 174, the slip ring 188 is connected to the brush 176, and the slip ring 190 is connected to the brush 172. The purpose of this arrangement of contacts and brushes will appear shortly.

The operation of this embodiment of my invention is as follows: When the vehicle or train is running, the handle 42 of the brake valve device 12 is maintained in release position, and if the speed of the train or vehicle is substantially constant, the pendulum 70 of the retardation controller device 18 will be in its central or neutral position, so that the electromagnets in the magnet valve devices 14 and 16 will be deenergized. The brake cylinder 10 will therefore be connected to the atmosphere, through the brake valve device 12 and the pipe and passages indicated in Fig. 1, and the brakes will thus be held released. The two wheels 134 and 136 will be rolling at the same, or substantially the same, speed.

If now it is desired to effect an application of the brakes to bring the vehicle or train to a stop in the shortest possible time, the handle 42 of the brake valve device is moved to application position where it is left. When the handle is initially moved, contact 44 is brought into engagement with contact 46, whereupon current is supplied from a suitable source to the electromagnet in the magnet valve device 22, by way of conductor 196, contacts 44 and 46, conductors 198 and 200, contacts 116 and 118, and resistance 202, the return to the source of current supply being through conductor 204.

The electromagnet in the magnet valve device 22 is thus energized to cause seating of the release valve 100 and unseating of the supply valve 98. Fluid under pressure then flows from the reservoir 40 past the unseated supply valve 98 to pipe 104, where it branches, one branch leading to the automotive brake cylinder 154 by way of pipe 160, and the other branch leading to the chamber 94 in the retardation controller device, past the unseated valve 108 in the magnet valve device 24, through pipe 126, the double check valve device 28, in which the valve 122 is forced to its extreme right hand position, and pipe 96.

When the handle 42 of the brake valve device reaches application position, fluid under pressure also flows from the reservoir 40 to the brake cylinder 10, by way of pipe and passage 38, chamber 32, pipe and passage 34, past the unseated valve 48 in the magnet valve device 14, and through pipe 206. Fluid also flows to the right of the check valve 122, but the pressure to the left of the check valve predominates and the check valve remains to the right. The brake on the measuring wheel 134 is thus applied ahead of the brakes on the vehicle or train. Although represented by a single brake cylinder 10, the train or vehicle brakes will be understood to include as many such similar brake cylinders as desired.

Now the brake on the measuring wheel 134 is designed so that when applied in the manner just described, the degree of application will be such that sliding of the measuring wheel will always be caused, and before the supply of fluid to the brake cylinder 10 (or a multiplicity of the brake cylinders) can cause the wheels of the vehicle or train to slide.

Before the brakes are applied the two wheels 134 and 136 will be rotating at substantially the same speed, and the brushes 172, 174 and 176 will maintain a relatively fixed relation with respect to the contacts 170. Should there exist a slight difference in the speed of these two wheels, such as might be caused by slight differences in diameter, or when rounding a curve, then the brushes will rotate with respect to the contacts 170, but, as will be explained hereinafter, this difference in speed will not affect the setting of the retardation controller device.

When the measuring wheel 134 is braked, however, the difference in speed of rotation of the two wheels will become appreciable, so that the contacts 170 will rotate under the brushes. Assuming for the sake of illustration that the contacts are relatively rotating in a clockwise direction with respect to the brushes, then when one end of a contact 170 is just engaging the brush 174 the other end is still in engagement with the brush 172. These two brushes will then be connected. Connection between these two brushes establishes a circuit to an upper or pick-up coil 210 of the relay 26 from the source of current supply, by way of conductor 196, contacts 44 and 46 on the brake valve device 12, conductors 198 and 200, a brush assembly 192, slip ring 186, brush 174, one of the contact segments 170, brush 172, slip ring 190, a brush assembly 192, conductor 212, and resistance 214, the return path to the source of current supply being by way of conductor 216. Since the relay 26 is of the quick pick-up type, its contacts 218 will be quickly closed.

As the contact 170 connecting brushes 172 and 174 passes out from under brush 172 this circuit will be interrupted, but due to the slow release characteristic of the relay it will hold its contacts 218 closed until this same contact segment 170 has connected brushes 174 and 176, which takes place after the first circuit has been interrupted due to the spacing between the contact segments. When this latter connection is made, a holding circuit to a holding coil 220 on the relay 26 will be established, which beginning from the brush 174, which as before described is connected to the source of current supply, includes brush 176, slip ring 188, a brush assembly 192, conductor 222, and contacts 218, the return circuit to the source of current supply being by way of the aforementioned conductor 216. The relay 26 will therefore hold its contacts 218 closed.

The closing of contacts 218 also completes a circuit from the source of current supply to the electromagnet 112 in the cut-off magnet valve device 24, the circuit thereto including that just previously described to the holding coil 220, and in addition including conductor 224 and resistance 226. The electromagnet 112 is thus energized to cause seating of the valve 108 and to cause movable contact 116 to disengage from stationary contact 118 and to engage stationary contact 120.

Seating of the valve 108 cuts off the supply of fluid under pressure to the chamber 94 in the retardation controller device, thus trapping the pressure at this time compressing the left hand light spring 74. The pressure trapped in chamber 94 corresponds to that which will just produce slipping of the measuring wheel 134. The retardation controller may be so designed that the setting caused by the trapped pressure in chamber 94 corresponds to a rate of retardation which will not quite cause slipping of the load bearing vehicle or train wheels.

Engagement of movable contact 116 with stationary contact 120 provides a holding circuit for the electromagnet 112, as will be obvious from the circuits shown, and disengagement from stationary contact 118 causes deenergization of the electromagnet in the magnet valve device 22. The supply of fluid under pressure to the automotive brake cylinder 154 will then be cut off, and the pressure in this brake cylinder will be released to the atmosphere via the pipe and passages heretofore described.

Since the handle 42 of the brake valve device was left in application position, the flow of fluid to the brake cylinder 10 continues until the rate of retardation produced by application of the brakes has reached a value where the force of inertia acting on pendulum 70 of the retardation controller overcomes the tension placed on the left hand light spring 74 and the pendulum has swung far enough to the left for movable contact 58 to have engaged stationary contact 62. When this takes place the electromagnet in the cut-off magnet valve device 14 will be energized from the source of current supply, by way of conductor 60, contacts 58 and 62, and conductor 64, the return path to the source being by way of conductor 225. The valve 48 in the magnet valve device 14 will then be seated to cut off the supply of fluid to the brake cylinder 10.

As the speed of the vehicle or train diminishes, the rate of retardation will increase due to the increase of coefficient of friction between the brake shoes and wheels, so that the pendulum 70 will swing further to the left. When movable contact 58 engages stationary contact 66, the electromagnet in the release magnet valve device 16 will be energized from the source of current supply, by way of conductor 60, contacts 58 and 66, and conductor 68, the return path to the source being by way of conductor 227. The magnet valve device 16 will therefore unseat the valve 52, whereupon fluid pressure in the brake cylinder 10 will be released to the atmosphere.

As soon as sufficient pressure has been released to cause the rate of retardation to reduce to the point where movable contact 58 disengages from stationary contact 66, the valve 52 will be seated, so that further release of pressure from the brake cylinder will be prevented. From what has been said it will be quite obvious that as the rate of retardation varies, the pendulum 70 will swing back and forth to either release fluid pressure from the brake cylinder, or to readmit pressure thereto, in accordance with the setting of the retardation controller device.

It will thus be seen that the adhesion measuring apparatus 20 causes the left hand light spring 74 in the retardation controller device to be compressed and held compressed according to the fluid pressure which will just cause slipping of the measuring wheel 134, and that this takes place during the initial stage of an application of the brakes, and that the parts may be so designed that the retardation controller device is set before the vehicle or train will have reached the rate for which the retardation controller device has been set, so that the maximum possible braking permitted by the adhesion between vehicle wheels and track rails may be taken advantage of.

As the train or vehicle approaches a stop, the rate of retardation may be diminished by moving the handle 42 to release position, whereupon contact 44 disengages from contact 46, and the magnet valve device 24 is deenergized. Fluid pressure is then released from the chamber 94 in the retardation controller device to the atmosphere, by way of the double check valve device 28, past the unseated valve 108 in the magnet valve device 24, past the unseated release valve 100 in the magnet valve device 22, and through port 106. The bringing of the train or vehicle to a smooth stop, and holding it at rest, may then be accomplished by manipulation of the brake valve handle 42.

As before stated, if the difference in the speed of the two wheels 134 and 136 is slight, the apparatus will not function to effect a setting of the retardation controller device. When there is a slight differential of speed between the two wheels, so that in rotating one of the segmental contacts 170 bridges the two brushes 172 and 174 to effect energization of the top or pick-up coil 210 on the relay 26, then before that segmental contact will have subsequently bridged brushes 174 and 176, to effect a holding of the relay, the relay will have been deenergized long enough to permit contacts 218 to open. It will therefore be apparent that the differential of speed between the two wheels must be great enough to rotate the contact segments 170 fast enough to close the holding circuit to the relay 26 before the relay drops its movable contact.

The resistances 202, 214 and 216, connected in series with the magnet valve device 22, the relay 26 and the magnet valve device 24, respectively, are provided to effect quick operation of these devices when initially energized, by reducing the time constant of the circuit due to the high inductance of the windings of these devices. This insures that the retardation controller device will be preset before the vehicle or train wheels reach the slipping stage.

If when an application of the brakes is effected, the magnet valve device 22 is not energized, so that fluid under pressure is not supplied to the left end of the check valve chamber 124, then fluid under pressure flowing to the right end of chamber 124 from the brake valve device 12 will move the check valve 28 to its extreme left hand position. Fluid will then flow to the chamber 94 in the retardation controller device in accordance with the supply effected by operation of the brake valve device 12. If the brake valve handle 42 is left in application position, this setting of the retardation controller will be the maximum provided for thereby.

While I have described one form which my invention may take, it will be apparent to those skilled in the art that many modifications and changes thereof may be made, and I do not wish to be limited to the specific embodiment shown

Having now described my invention, what I claim as new and desire to secure by Letters Patent, is:

1. In a vehicle brake system, in combination, brake means for braking the vehicle, means for effecting an application of said brake means, an element adapted to engage a track rail, means for determining the adhesion between said element and rail, and means for preventing the application of said brake means from producing a braking effect exceeding that corresponding to the adhesion determined between said element and rail.

2. In a vehicle brake system, in combination, brake means for braking the vehicle, means for effecting an application of said brake means, an auxiliary wheel adapted to roll on a track rail and being unaffected by the application of said brake means, means for determining the adhesion between said wheel and rail, and means for controlling the application of said brake means in accordance with the adhesion between said wheel and rail.

3. In a vehicle brake system, in combination, a brake cylinder for producing a braking effect on load bearing wheels of the vehicle, an auxiliary non-load bearing wheel adapted to roll on a track rail, means for effecting a supply of fluid under pressure to said brake cylinder, means for independently producing a braking effect on said wheel to a degree sufficient to cause said wheel to slide, means including a retardation controller device providing for variable settings thereof for controlling the supply of fluid under pressure to said brake cylinder, and means for automatically effecting a setting of said retardation controller device in accordance with the braking effect which produces sliding of said wheel.

4. In a vehicle brake system, in combination, a brake cylinder for producing a braking effect on the load bearing wheels of the vehicle, an auxiliary wheel adapted to roll on a track rail, means for effecting a supply of fluid under pressure to said brake cylinder, means including a retardation controller device for controlling the supply of fluid under pressure to said brake cylinder, pressure actuated means for varying the setting of said retardation controller device, independent fluid pressure brake means for producing a braking effect on said auxiliary wheel, means for effecting a supply of fluid under pressure simultaneously to said pressure actuated means and to said independent fluid pressure brake means, and means rendered operable when said auxiliary wheel begins to slide to cut off the supply of fluid to said pressure actuated means.

5. In a vehicle brake system, in combination, a brake cylinder for producing a braking effect on the load bearing wheels of the vehicle, an auxiliary non-load bearing wheel adapted to roll on a track rail, means for effecting a supply of fluid under pressure to said brake cylinder, means including a retardation controller device for controlling the supply of fluid under pressure to said brake cylinder, pressure actuated means for controlling the setting of said retardation controller device, fluid pressure brake means for producing a braking effect on said auxiliary wheel, means for effecting a supply of fluid under pressure to said pressure actuated means and to said fluid pressure brake means to a degree sufficient to cause sliding of said wheel, electrically operated means for controlling the supply of fluid to said pressure actuated means, and means rendered operable when said auxiliary wheel begins to slide for effecting operation of said electrically operated means to cut off the supply of fluid to said pressure actuated means.

6. In a vehicle brake system, in combination, brake means for producing a braking effect on the load bearing wheels of the vehicle, an auxiliary non-load bearing wheel adapted to roll on a track rail, means for effecting an application of said brake means, means including a retardation controller device for controlling the application of said brake means, regulating means for varying the setting of said retardation controller device, means for determining the adhesion between said auxiliary wheel and track rail, and means for operating said regulating means in accordance with the adhesion determined between said auxiliary wheel and rail.

7. In a vehicle brake system, in combination, a retardation controller device providing for different adjustments thereof, an element adapted to engage a track rail, means for determining the adhesion between said element and rail, and means for effecting an adjustment of said retardation controller device corresponding to the adhesion determined between said element and rail.

8. In a brake control system, the combination with a retardation controller device providing for different settings thereof, of pressure actuated means for varying the setting of said retardation controller device, a wheel adapted to roll on a track rail, fluid pressure brake means associated with said wheel and adapted to produce a braking effect thereon, means for effecting a supply of fluid under pressure to said pressure actuated means and to said fluid pressure brake means to a degree sufficient to cause sliding of said wheel, electrically operated means for cutting off the supply of fluid to said pressure actuated means and for retaining the pressure of said fluid in said means, and means rendered operable when said wheel commences to slide for effecting operation of said electrically operated means.

9. In a vehicle brake control system, the combination with a retardation controller device providing for variable settings thereof, of a pressure actuated device operable to vary the setting of said retardation controller device, a wheel adapted to roll on a track rail, fluid pressure brake means for producing a braking effect on said wheel, means for effecting a supply of fluid under pressure to said pressure actuated device and to said fluid pressure brake means to a degree sufficient to cause sliding of said wheel, an electrically operated valve device operable to cut off the supply of fluid to said pressure actuated device and to retain the pressure of fluid therein, a relay controlling operation of said electrically operated valve means, and means rendered operable when said wheel commences to slide for energizing said relay to effect operation of said electrically operated valve means.

10. In a vehicle brake control system, the combination with a retardation controller device providing for different settings thereof, of pressure actuated means for varying the setting of said retardation controller device, a pair of wheels adapted to roll on track rails, fluid pressure brake means associated with one of said wheels and adapted to produce a braking effect thereon, contacts carried by each of said wheels, the contacts on one wheel being adapted to engage the contacts on the other of said wheels when said wheels are rotating at different speeds, means for effecting a supply of fluid under pressure to said pressure actuated means and to said fluid pressure brake means to a degree sufficient to cause sliding of said braked wheel, electromagnetic means for cutting off the supply of fluid to said pressure actuated means and for retaining the pressure of said fluid in said means, a relay having contacts controlling operation of said electromagnetic means, and means whereby for differences in speed of said wheels below a predetermined value said relay is insufficiently energized to effect operation of said electromagnetic means and for speeds above said predetermined value said relay is energized sufficiently to effect operation of said electromagnetic means.

11. In a vehicle brake control system, the combination with a retardation controller device providing for variable settings thereof, of a pressure actuated device operable to vary the setting of said retardation controller device, a pair of wheels adapted to roll on track rails, a plurality of contacts carried by each of said wheels, each of the contacts on one of said wheels being adapted to successively engage the contacts on the other of said wheels when said wheels are rotating at different speeds, fluid pressure brake means for producing a braking effect on one of said wheels, means for effecting a supply of fluid under pressure to said pressure actuated device and to said fluid pressure brake means to a degree sufficient to cause sliding of said braked wheel, a magnet valve device for cutting off and retaining the pressure of fluid supplied to said pressure actuated device, switch means associated with said magnet valve device, said switch means controlling operation of said fluid supply means, a relay operable to control operation of said magnet valve device, and means effective when a contact carried by one of said wheels engages a plurality of contacts carried by the other of said wheels for energizing said relay.

12. In a vehicle brake control system, the combination with a retardation controller device providing for variable settings thereof, of a pressure actuated device operable to vary the setting of said retardation controller device, a pair of wheels adapted to roll on track rails, a plurality of contacts carried by each of said wheels, each of the contacts on one of said wheels being adapted to successively engage the contacts on the other of said wheels when said wheels are rotating at different speeds, fluid pressure brake means for producing a braking effect on one of said wheels, means for effecting a supply of fluid under pressure to said pressure actuated device and to said fluid pressure brake means to a degree sufficient to cause sliding of said braked wheel, a magnet valve device for cutting off and retaining the pressure of fluid supplied to said pressure actuated device, switch means associated with said magnet valve device, said switch means controlling operation of said fluid supply means, a relay operable to control operation of said magnet valve device, means operable when said wheels are rotating at different speeds for causing a contact carried by one of said wheels to engage a plurality of contacts carried by the other of said wheels to effect energization of said relay, and means for preventing said energization of said relay from causing operation of said magnet valve device until the difference in speed of rotation of said wheels has reached a predetermined value.

13. In a vehicle brake system, the combination with a brake cylinder and a pair of wheels adapted to roll on track rails, of a brake valve device for controlling the supply of fluid under pressure to said brake cylinder, electrically operated valve means for also controlling the supply of fluid under pressure to and its release from said brake cylinder, a retardation controller device for controlling operation of said electrically operated valve means, regulating means for varying the setting of said retardation controller device, fluid pressure brake means associated with one of said wheels and adapted to produce a braking effect thereon, magnet valve means for controlling the supply of fluid under pressure to and its release from said regulating means and said fluid pressure brake means, electrically controlled valve means for cutting off the flow of fluid to said regulating means, switch means operated by said electrically controlled valve means for controlling said magnet valve means, a relay for controlling said electrically controlled valve means, and contacts rotatable with each of said wheels and adapted upon a difference in the speed of rotation of said wheels to effect energization of said relay.

14. In a vehicle brake system, the combination with a brake cylinder, of a brake valve device operable when moved to application position to effect a supply of fluid under pressure to said brake cylinder, means including a retardation controller device for controlling the pressure in said brake cylinder in accordance with the setting of said retardation controller device, pressure actuated means for varying the setting of said retardation controller device, means for supplying fluid under pressure to said pressure actuated means when said brake valve device is in application position, means responsive to movement of said brake valve device toward application position for also effecting a supply of fluid under pressure to said pressure actuated means, and means for preventing said first supply from reaching said pressure actuated means when said second supply is available.

15. In a fluid pressure brake system, the combination with a brake cylinder, of a brake valve device operable when moved to application position to effect a supply of fluid under pressure to said brake cylinder, electrically operated valve means for controlling the supply of fluid under pressure to and its release from said brake cylinder, a retardation controller device for controlling said electrically operated valve means, pressure actuated means for varying the setting of said retardation controller device, means for supplying fluid under pressure to said pressure actuated means in accordance with that supplied to said brake cylinder, electromagnetic valve means operable to also supply fluid under pressure to said pressure actuated means, contacts carried by said brake valve device and operable to effect operation of said electromagnetic valve means to supply fluid to said pressure actuated means before fluid is supplied by operation of said brake valve device.

16. In a vehicle brake system, the combination with a reservoir and a retardation controller device having a body movable against opposition of a spring, of fluid pressure actuated means for compressing said spring, manually operated valve means for supplying fluid under pressure to operate said pressure actuated means, electrically operated valve means for also supplying fluid under pressure to operate said pressure actuated means, and means for preventing fluid from being supplied to said pressure actuated means by one of said valve means when supplied by the other.

17. In a vehicle brake system, the combination with a brake cylinder, of means for controlling the degree of fluid under pressure supplied to said brake cylinder, including an adjustable device operable to limit the degree of pressure established in said brake cplinder, means including an electroresponsive device for effecting adjustments of said adjustable device, a pair of wheels adapted to roll on track rails, contact members rotatable with each of said wheels, the contacts rotatable with one wheel being adapted to engage the contacts rotatable with the other wheel when the wheels differ in speed to effect energization of said electroresponsive device, and manually operated means for effecting deenergization of said electroresponsive device at will.

18. In a vehicle brake system, the combination with a brake cylinder, of a pair of wheels adapted to roll on track rails, means providing for relative movement between said wheels, brake means for producing a braking effect on one of said wheels, means controllable at will by an operator for rendering said brake means operative to produce a braking effect sufficient to cause sliding of said one wheel, and means rendered operative upon relative movement between said wheels due to sliding of said one wheel for controlling the degree of supply of fluid under pressure to said brake cylinder.

19. In a vehicle brake apparatus, in combination, a wheel adapted to roll on a track rail, means for effecting an application of the vehicle brakes, a controller mechanism operable at a predetermined rate of retardation of the vehicle for reducing the degree with which the vehicle brakes are applied, means for determining the coefficient of adhesion between said wheel and the track rail, and means controlled in accordance with the coefficient of adhesion between the track rail and said wheel for adjusting said controller mechanism to operate at a different rate of retardation.

20. In a vehicle brake apparatus, in combination, means for effecting an application of the vehicle brakes, an element adapted to engage a track rail, means for determining the adhesion between said element and rail, and means for controlling the application of the brakes to produce a rate of retardation due to braking in accordance with the adhesion between said element and rail.

21. In a vehicle brake system, in combination, a brake cylinder for the main vehicle brakes, means for effecting a supply of fluid under pressure to the brake cylinder, a retardation controller device for controlling the supply of fluid under pressure to the brake cylinder according to the rate of retardation of the vehicle and adapted to be adjusted to respond to different rates of retardation, and means operated independently and substantially in advance of supplying fluid under pressure to the brake cylinder for adjusting said retardation controller device to operate at a rate of retardation corresponding to the adhesion between the vehicle wheels and rails.

22. In a vehicle brake system, in combination, a brake cylinder for braking the vehicle, means for effecting a supply of fluid under pressure to the brake cylinder, a retardation controller device for controlling the supply of fluid under pressure to the brake cylinder according to the rate of retardation of the vehicle and adapted to be adjusted to respond to different rates of retardation, means for determining the adhesion between the vehicle wheels and track rails and for adjusting the retardation controller device to respond to a rate of retardation corresponding to the adhesion determined, and means for rendering said last means operative substantially in advance of effecting the supply of fluid under pressure to the brake cylinder.

JOSEPH C. McCUNE.